United States Patent [19]

Gomes

[11] Patent Number: 4,726,705

[45] Date of Patent: Feb. 23, 1988

[54] KNOCK DOWN PIVOT FASTENER

[76] Inventor: Daniel Gomes, P.O. Box 117, Worcester, N.Y. 12197

[21] Appl. No.: 893,011

[22] Filed: Aug. 4, 1986

Related U.S. Application Data

[63] Continuation-in-part of Ser. No. 781,030, Sep. 27, 1985, Pat. No. 4,616,953.

[51] Int. Cl.$^4$ ............................ B25G 3/00; F16P 1/00
[52] U.S. Cl. .................... 403/407.1; 411/510; 24/662
[58] Field of Search ................ 403/298, 407.1, 406.1, 403/405.1, 299; 411/508, 509, 510; 24/662, 681, 694, 297, 621

[56] References Cited

U.S. PATENT DOCUMENTS

| | | |
|---|---|---|
| 778,413 | 12/1904 | Kilmon . |
| 1,594,415 | 8/1926 | Kalgren . |
| 2,556,449 | 6/1951 | Scheeler . |
| 2,701,384 | 2/1955 | Barroero . |
| 2,817,871 | 12/1957 | Ferry . |
| 2,964,341 | 12/1960 | Doyle et al. . |
| 3,000,049 | 10/1961 | Terry, Jr. . |
| 3,013,297 | 12/1961 | Ferry . |
| 3,015,126 | 1/1962 | Ahlgren . |
| 3,068,508 | 12/1962 | Heyer . |
| 3,539,234 | 8/1966 | Rapata . |
| 3,551,963 | 1/1971 | Mosher, Jr. et al. ............ 24/662 X |
| 3,725,973 | 4/1973 | Gwozdz . |
| 4,059,041 | 11/1977 | Hassan ............................ 24/694 X |
| 4,067,656 | 1/1978 | Dennis . |
| 4,122,583 | 10/1978 | Grittner et al. ................. 411/510 X |
| 4,616,953 | 10/1986 | Gomes ............................ 403/407.1 |

FOREIGN PATENT DOCUMENTS 1316472  5/1973  United Kingdom ................. 24/681

*Primary Examiner*—Andrew V. Kundrat
*Attorney, Agent, or Firm*—Woodard, Emhardt, Naughton, Moriarty & McNett

[57] ABSTRACT

In one embodiment of the present invention a fastener assembly comprises a first and second bushing that are each inserted into respective parts to be coupled. The first bushing has a bearing post member extending from its mating face. The bearing post member has two circumferential locking flanges spaced along its length. The second bushing member has an axially-extending opening to receive the bearing post member. The opening has two reduced diameter sections situated to coincide with the circumferential locking flanges when the bearing post member is inserted into the opening. The reduced diameter sections are in snap-fit engagement with the circumferential locking flanges to resist separation of the first and second bushing members. Fastener stability and strength is increased by requiring a fixed dimensional relationship between the length of the bearing post member and the effective radial gap existing between the post member and the opening in the second bushing member when the post member is inserted therein. Fastener "slop" is further reduced by requiring another fixed dimensional relationship between the effective diameter and the length of the bearing post member. Variations on this embodiment are described, including a separate bearing post member that is statically attached to the first bushing member, a sleeve detachably connecting the interconnecting portions of each bushing to their respective lead end portions, and a wedge to expand the outer surface of each bushing within their respective bores.

38 Claims, 7 Drawing Figures

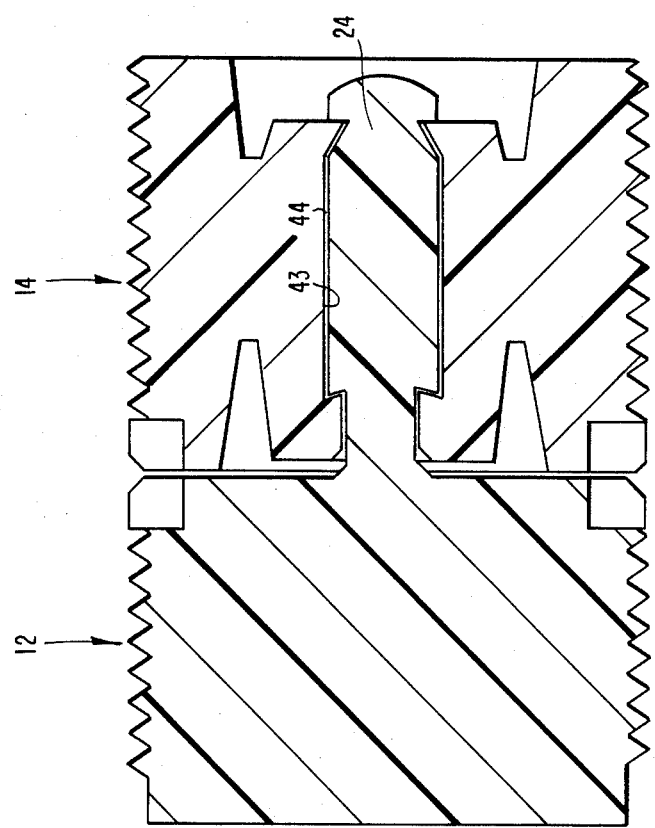

KNOCK DOWN PIVOT FASTENER

The invention is a continuation-in-part on patent application Ser. No. 781,030, filed Sept. 27, 1985, now U.S. Pat. No. 4,616,953, issued on Oct. 14, 1986.

BACKGROUND OF THE INVENTION

This invention relates generally to the field of fasteners and more specifically to a pivot fastener construction useful in coupling a first part to a second part while permitting relative rotation therebetween.

The use of fasteners, hinges and joints which permit pivotal movement is well known. The present invention relates to a pivot fastener useful for coupling two objects, such as multi-piece, knock down type (K-D) furniture assemblies or the like. In the past, K-D fasteners tended to separate easily when they were subjected to sufficient lateral force. Another tendency of past K-D fasteners has been that they frequently suffer from "slop", i.e., motion of the coupled objects transverse to the axis of the fastener joining them which results in the fastener suffering uneven and undue wear when it is subjected to stress.

A principal challenge confronted and met in this invention has been to develop a blind pivot fastener that will not unwantingly separate when subjected to normal forces and conditions and which will minimize the problems of uneven and undue wear associated with slop.

SUMMARY OF THE INVENTION

One embodiment of the invention is a pivot fastener useful in coupling a first part to a second part including a first bushing member and a second bushing member. The first bushing member has an outer surface with means for securing the first bushing member in fixed relationship to the first part. The first bushing member also has a mating face including an axially extending bearing post member with a bearing end and a first circumferential retaining flange. The second bushing member has an outer surface with means for securing the second bushing member in fixed relationship to the second part. The second bushing member also has a mating face with an axially extending opening for receiving the bearing end of the bearing post member therethrough. The opening has a mating bearing surface and a reduced diameter portion for engaging with the first retaining flange in snap-fit relationship to prevent separation of the first and second bushing members when the bearing post member is received therein while also permitting relative rotation therebetween. In this embodiment, the bearing post member and the mating bearing surface in the opening coact in a fixed relationship to resist normal rotation of the first bushing member relative to the second bushing member.

It is one object of the invention to provide an improved pivot fastener. Another object is to provide a knock-down type pivot fastener that can be used as a blind connection between parts being coupled.

Yet another object of the present invention is to provide a pivot fastener that reduces manufacturing and production costs. A further object of the present invention is to provide a pivot fastener that permits use of new options in means for securing the fastener in place. Reducing "slop" and increasing the stability and strength of the fastener is still another object.

Further objects and advantages of the invention will be apparent from the following detailed description taken in conjunction with the appended claims.

BRIEF DESCRIPTION OF THE DRAWINGS

FIG. 1A is an enlarged, sectional view of the pivot fastener of FIG. 1 when the pivot fastener is interlocked.

DESCRIPTION OF THE PREFERRED EMBODIMENT

Figure 1:
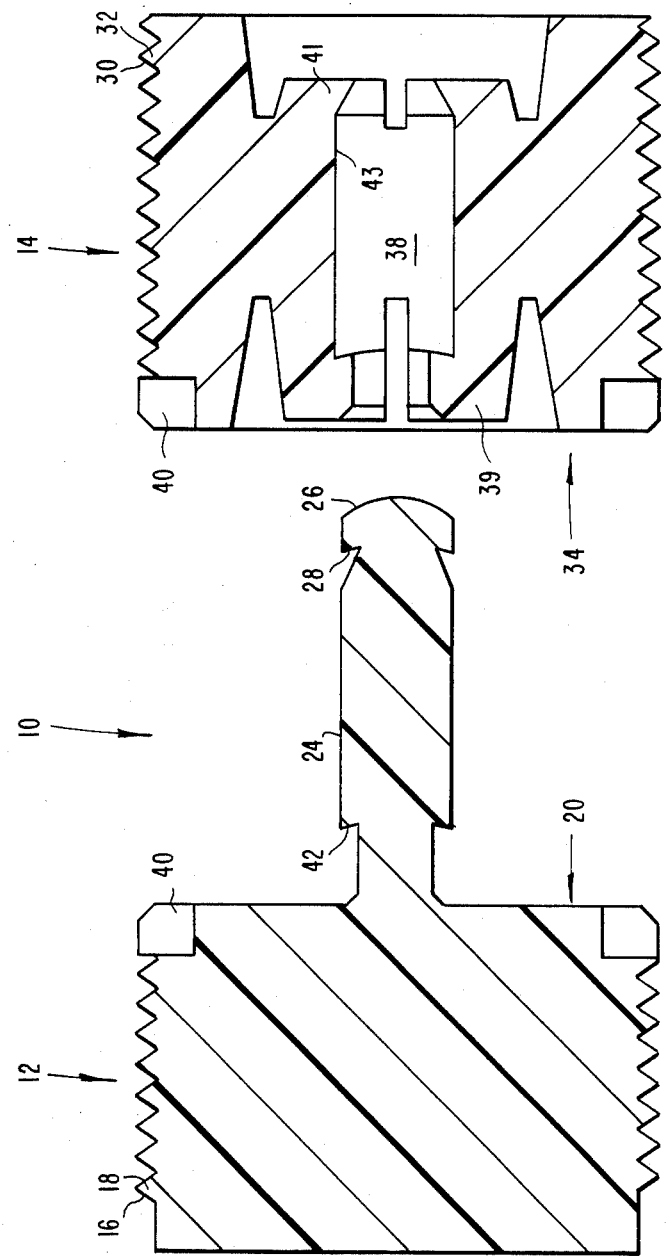
FIG. 1 is an enlarged, sectional view of a pivot fastener, prior to interlocking, according to a typical embodiment of the present invention.

For the purposes of promoting an understanding of the principles of the invention, reference wil now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated as would normally occur to one skilled in the art to which the invention relates are herein incorporated.

Referring to FIG. 1, there is illustrated a pivot fastener 10 which includes first bushing member 12 and second bushing member 14. Outer surface 16 of first bushing member 12 is threaded. Threading 18 permits first bushing member 12 to be secured in fixed relationship to the first part (not illustrated) which is sought to be joined. Mating face 20 of first bushing member 12 includes an axially extending bearing post member 24. Bearing post member 24 has bearing end 26 and a first circumferential retaining flange 42.

Outer surface 30 of second bushing member 14 is threaded. Threading 32 permits second bushing member 14 to be secured in fixed relationship to the second part (not illustrated) which is sought to be joined. Mating face 34 of second bushing member 14 includes an axially extending opening 38. Opening 38 has a circumferential bearing surface 43. Opening 38 receives bearing end 26 of bearing post member 24 therethrough. Reduced-diameter portion 39 of second bushing member 14 engages with first retaining flange 42 in a snap-fit relationship creating a primary locking mechanism preventing speparation of first bushing member 12 from second bushing member 14 once bearing post member 24 is inserted therein while also permitting first bushing member 12 to rotate axially relative to second bushing member 14. It is understood that the pivot fastener of the present invention can be used to provide a blind connection between the parts being coupled.

In K-D fastener design, the need for relative axial rotation between the first and second parts is accomplished at a sacrifice of stability, strength and reliability. Where smallness, in terms of overall fastener length and diameter, is sought, an auxiliary locking mechanism is necessary to reduce "slop" in the fastener. However, where fastener smallness is not essential, the requisite stability, strength and reliability can be accomplished by establishing a fixed dimensional relationship between the bearing post member 24 and the mating bearing surface 43. Referring to FIG. 1A, when the bearing post member 24 on the first bushing member 12 is inserted into the opening 38 in the second bushing member 13, the bearing post member 24 is offset from the circumferential bearing surface 43 of the opening 38 by an effective radial gap 44. To reduce the "slop" in the fastener the length dimension of bearing post member 24 is at least ten (10) times larger than the dimension of the effective radial gap 44. Thus, as the effective radial gap is made larger, the length of the bearing post member is correspondingly made longer to preserve the requisite dimensional relationship. This dimensional relationship geometrically fixes the normal rotational angle of the bearing post member 24 within the opening 38 that corresponds to the "slop" in the fastener. It is understood that reference to 'normal rotation' means rotation about an axis perpendicular to the longitudinal axis of the bearing post member. Another source of slop arises in the bending of the bearing post member as its length increases. A further fixed dimensional relationship relating the effective diameter of the bearing post member to its length reduces the amount of bending in the bearing post member, and, consequently, the amount of "slop" in the fastener. An axial length dimension no greater than four (4) times the dimension of the effective radius of the bearing post member is necessary to ensure adequate stability, strength and reliability of the fastener.

The bushing members each have a number of slots 40 to permit a conventional driving tool to be utilized in the positioning of the bushing members in the respective parts to be coupled. Bushing members 12 and 14 are shown each with four driving tool slots. It is understood, however, that bushing members without driving tool slots, as well as bushing members having greater or fewer than four driving tool slots may be used in the pivot fastener of the present invention.

In FIG. 1 bearing post member 12 is shown with first retaining flange 42, near its base, and second retaining flange 28, near its bearing end. Correspondingly, second bushing member 14 is shown with a second reduced-diameter portion 41 near the end of the opening 38. Reduced-diameter portion 41 engages with second retaining flange 28 in a snap-fit relationship creating a second locking mechanism preventing separation of first bushing member 12 from second bushing member 14 once bearing post member 24 is inserted therein, while also permitting first bushing member 12 to rotate axially relative to second bushing member 14. It is noted that either retaining flange, alone, in engagement with reduced-diameter portions 39 and 41, respectively, may be sufficient to prevent separation of the bushing members. It is understood that by changing the angle at which the retaining flanges engage with the opening, the pulling force required to disassemble the fastener can be altered and that the fastener can be designed to allow disassembly to be quickly and easily accomplished when desired.

Figure 2:
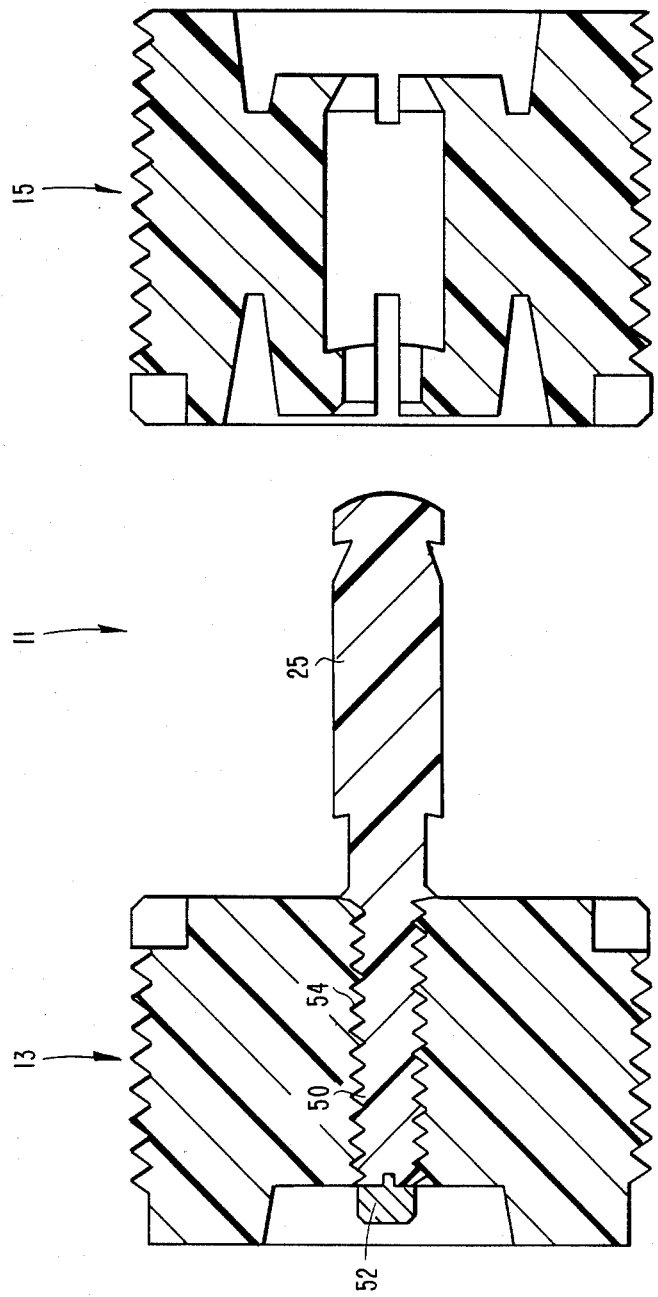
FIG. 2 is an enlarged, sectional view of a pivot fastener, prior to interlocking, having a statically attached bearing post member according to a typical embodiment of the present invention.

Referring to FIG. 2, pivot fastener 11 is illustrated as having bearing post member 35 statically attached to first bushing member 13 rather than formed as a part of it. The interaction of first bushing member 13 with second bushing member 15 is otherwise similar to the interaction of the first and second bushing members described above. Bearing post member 25 has an anchor portion 50 with anchor end 52. Bushing member 13 has axially extending aperture 54 for receiving anchor portion 50 of the bearing post member. Aperture 54 engages anchor portion 50 preventing separation of bearing post member 25 from bushing member 13. Bearing post member 25 is shown as threaded into bushing member 13 but it is understood that other means of attaching bearing post member to the bushing member, such as press fitting or knurled surfaces, are also contemplated.

Figure 3:
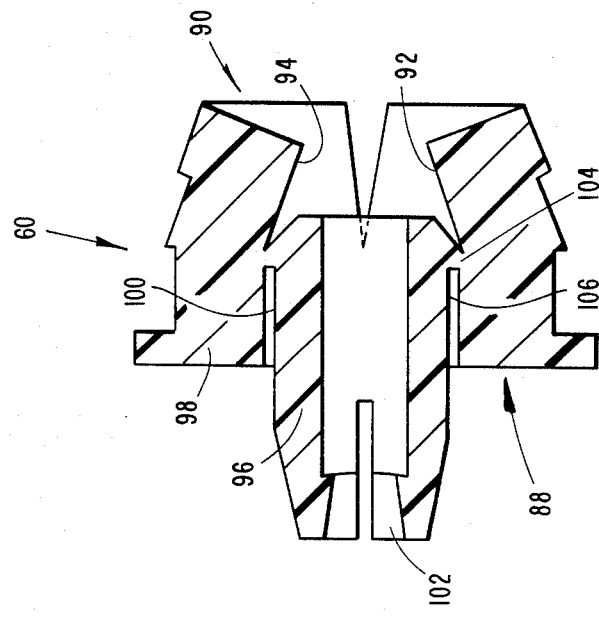
FIG. 3 is an enlarged, sectional view of a pivot fastener, prior to interlocking, in which each bushing member has an expandable, one-piece design according to a typical embodiment of the present invention.
Figure 3:
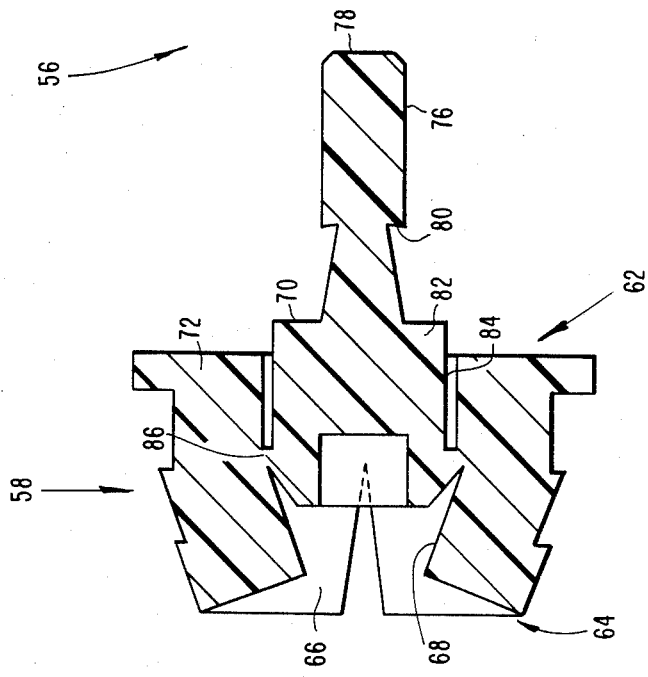

Referring to FIG. 3, there is illustrated pivot fastener 56 which is useful in coupling a first part (not illustrated) with a first bore to a second part (not illustrated) with a second bore. Pivot fastener 56 includes bushing members 58 and 60. Bushing member 58 includes mating face portion 62, lead end portion 64, and first ring section 72. Lead end portion 64 is sized to permit insertion of bushing member 58 into the bore of one of the parts to be fastened. Lead end portion 64 has axially extending aperture 66 with knurled surface 68. The mating face portion 62 includes central bearing post section 70. Bearing post section 70 includes axially extending bearing post member 76 having bearing end 78, circumferential retaining flange 80 and adjacent base portion 82 with knurled outer surface 84. Mating face portion 62 has sleeve 86 which detachably connects bearing post section 70 to first ring section 72. Sleeve 86 detaches to permit bearing post section 70 to advance through aperture 66, expanding lead end portion 64 to secure bushing member 58 in fixed relationship in the first bore.

Bushing member 60 includes mating face portion 88, lead end portion 90, and second ring section 98. Lead end portion 90 is sized to permit insertion of bushing member 60 into the bore of the other part to be fastened. Lead end portion 90 has axially extending aperture 92 with knurled surface 94. Mating face portion 88 includes central bearing post receiving section 96. Bearing post receiving section 96 has a knurled outer surface 100. Bearing post receiving section 96 also has axially extending opening 102 for receiving bearing post lead end 78. Opening 102 engages retaining flange 80 preventing separation of bushing member 58 from bushing member 60 once bearing post member 76 is inserted therein, while also permitting bushing member 58 to rotate axially relative to bushing member 60. Mating face portion 88 has a sleeve 104 detachably connecting bearing post receiving section 96 to ring section 98. Sleeve 104 detaches permitting bearing post receiving section 96 to advance through aperture 92, expanding lead end portion 90 to secure bushing member 60 in fixed relationship in the second bore.

Bushing members 58 and 60 are of a design which allows for one piece construction. The one piece construction of expandable bushing members eliminates the need for a separate wedge devices to produce the expansion of the bushing member. By reducing the number of parts required, the pivot fastener design disclosed can be less costly to produce.

Figure 4:
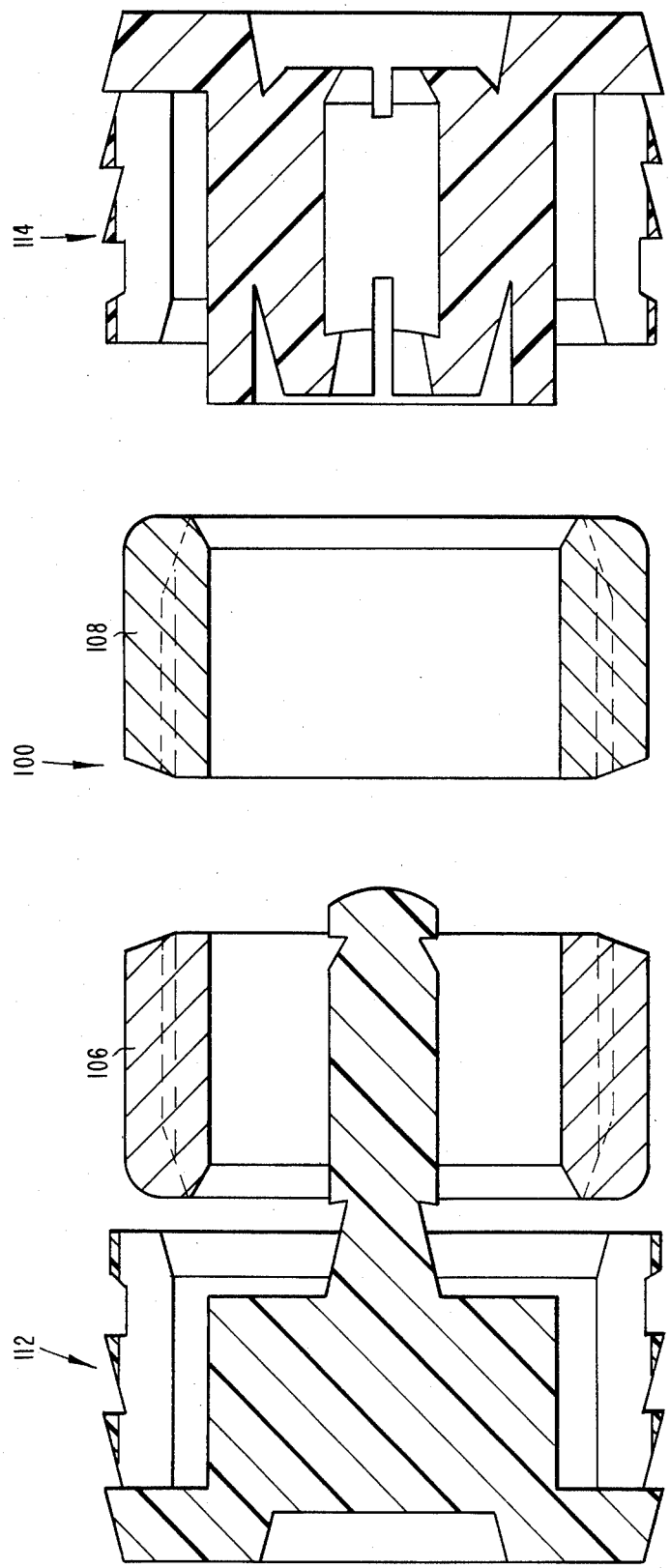
FIG. 4 is an enlarged, exploded, sectional view of a pivot fastener, prior to interlocking, having bushing members expandable by a separate wedge according to a typical embodiment of the present invention.

In FIG. 4, there is illustrated pivot fastener 110 having bushing members 112 and 114 which are expandable. Bushing members 112 and 114 are inserted in bores in the respective parts (not illustrated) to be coupled. Wedges 106 and 108 are used to expand the bushings in place, securing the respective bushing member in fixed relationship to the respective part to be coupled. It is to be understood that wedges of identical design may be used to expand each of the bushing members and that wedges can be manufactured with different tolerance to accommodate a wider variety of materials to be coupled. A wedge-in design also allows for automated insertion of bushing members. The expansion of bushing members already in place in their respective bores does not require the same high degree of design precision required of bushing members which expand during insertion.

Figure 5:
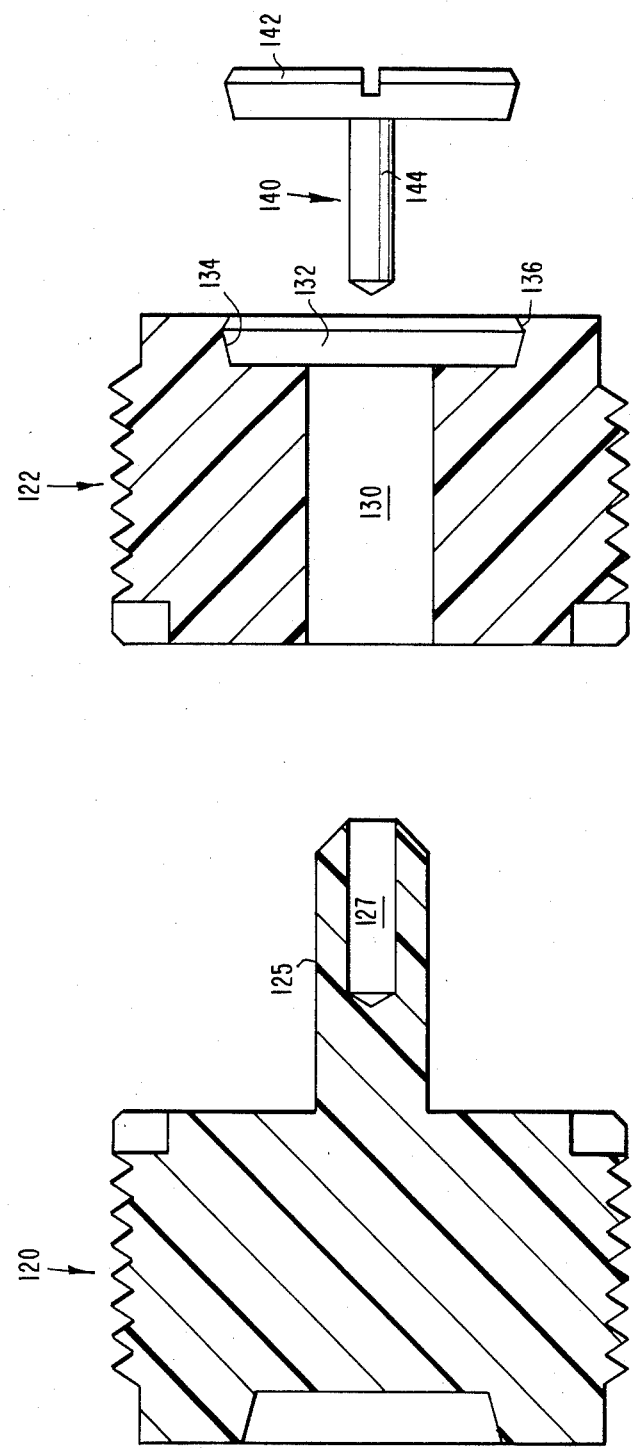
FIG. 5 is an enlarged, sectional view of a pivot fastener, prior to interlocking, according to a second embodiment of the present invention.
Figure 6:
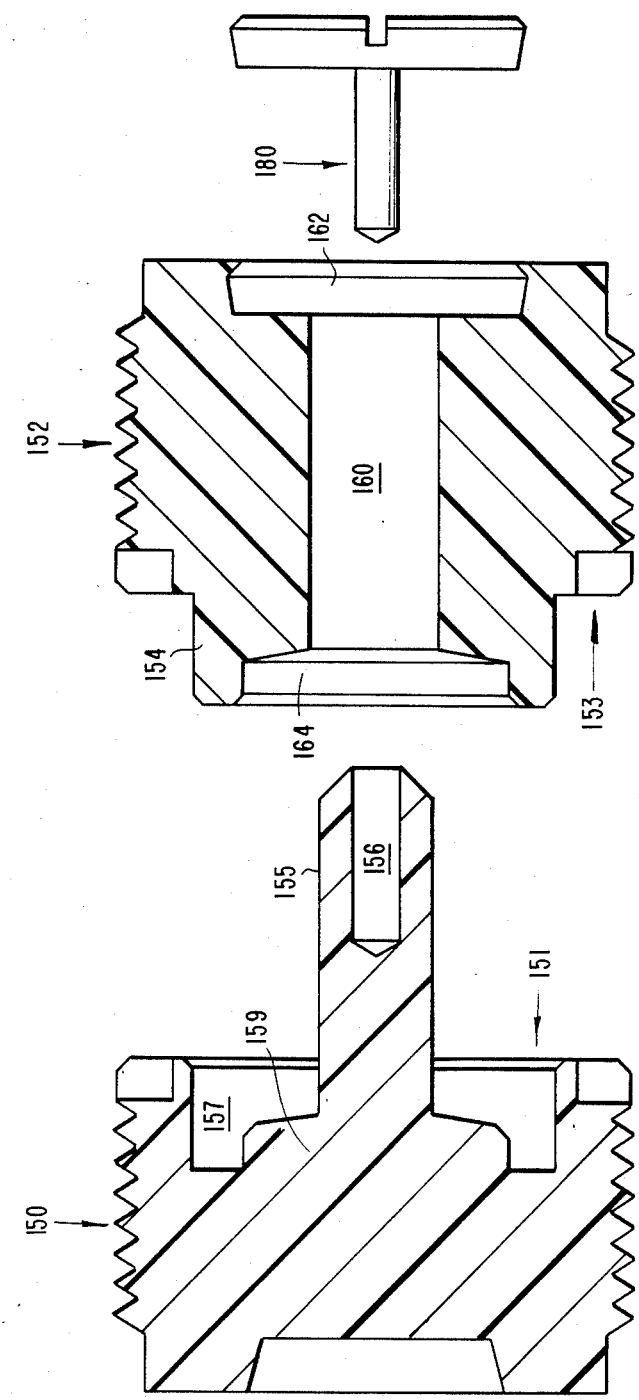
FIG. 6 is an enlarged, sectional view of a pivot fastener, prior to interlocking, having a locking collar and locking sleeve, according to a typical embodiment of the present invention.

Referring to FIG. 5, an alternative embodiment of the present invention has a first bushing member 120 and a second bushing member 122. Bushing member 120 has an axially-extending bearing post 125. The bearing post 125 has an axially-extending opening 127 in the end of the post. Second bushing member 122 has an axially-extending opening 130 with a countersunk section 132 at one end of the opening. The countersunk section 132 has a circumferential locating surface 134 which is formed into a retaining lip 136. A retaining pin 140 has a head portion 142 and a knurled post portion 144. When the first and second bushing members 120 and 122, respectively, are assembled, the bearing post 125 is inserted into the opening 130. The knurled post portion 144 of the retaining pin 140 is pressed into the opening 127 in the bearing post 125, thereby resisting separation of the two bushing members, while permitting relative axial rotation therebetween. When the retaining pin is engaged within the opening 127, the head portion 142 is fully contained within the countersunk section 132. When the fastener is not to be pre-assembled before being secured in fixed relationship with the parts to be joined, the retaining lip 136 is useful to hold the head portion 142 in place within the countersunk section 132. In this instance, each bushing member is installed within bores in each part to be connected, after which the bushing members are joined by pressing the retaining pin 140 into the opening 127 of the bearing post 125.

Bushing members 150 and 152 show a similar fastener assembly with an additional means to increase stability and strength in the fastener. The mating face 151 on the first bushing member 150 has a circumferential locking sleeve 157. The bearing post member 155 has a shoulder 159 at its base. The mating face 153 of the second bushing member 152 has a circumferential locking collar that is received within the locking sleeve 157. The axially-extending opening 160 has a recess 164 situated at the locking collar and formed to receive the shoulder 159. The retaining pin 180 is pressed into the opening 156 in the bearing post member 155, and is retained within the countersunk section 162 when in the assembled configuration. The addition of the locking sleeve, locking collar and shoulder provides further resistance against "slop" in the fastener.

The pivot fasteners described above are designed to permit insertion and securement of each bushing member in a responsive part to be coupled prior to the interlocking of the bushing members that results upon assembly. The use of pivot fasteners in an unassembled state (i.e. pre-interlocking) results in numerous manufacturing advantages. The user is no longer limited to securing means which are highly material-sensitive, i.e., techniques such as gluing or force-fitting, as was common with prior fasteners of this general nature. The use of unassembled pivot fasteners permits the use of securing means such as threading on the outer surface of the bushing members. The manufacturer is also presented with a number of options as to the assembly of the fastener; for example, the use of threaded bushings permits the positioning and fastening of the fastener to be done automatically by a machine or in the alternative allows for designs in which the fastening is done by the ultimate user. Factors such as a construction with fewer parts and the elimination of the need to assemble the fastener prior to use reduce the expenses of the manufacture and production and in turn may permit the manufacturer to sell his product at a lower cost to the consumer.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A pivot fastener useful in coupling a first part to a second part, comprising;
    a first bushing member having an outer surface with means for securing said first bushing member in fixed relationship to a first part, said first bushing member also having a mating face including an axially extending bearing post member with a first circumferential retaining flange and a bearing surface;
    a second bushing member having an outer surface with means for securing said second bushing member in fixed relationship to a second part, said second bushing member also having a mating face including an axially-extending opening, coextensive with said bearing post member, for receiving the bearing surface of the bearing post member therethrough, the opening having a mating bearing surface with a reduced diameter portion for engaging the first retaining flange in a snap-fit relationship for preventing separation of said first and second bushing members when the bearing post member is received therein while also permitting relative axial rotation therebetween; and
    means, including said bearing surface on said bearing post member coacting with said mating bearing surface on said axially-extending opening in said second bushing member, for resisting normal rotation of said first bushing member relative to the second bushing member while also permitting relative axial rotation therebetween, wherein said normal rotation is about an axis perpendicular to the axis of said bearing post member.

2. The pivot fastener of claim 1, wherein said means for resisting normal rotation comprises:
    said bearing surface having an axial length of fixed dimensional relationship with the effective radial gap between said bearing surface on said bearing post member and said mating bearing surface on said axially-extending opening in said second bushing member when the bearing post member is received therethrough.

3. The pivot fastener of claim 2, wherein said means for resisting normal rotation further comprises:
   said bearing surface further having an axial length of fixed dimensional relationship with the effective radius of said bearing surface.

4. The pivot fastener of claim 2, wherein said means for resisting normal rotation further comprises:
   said bearing surface of said bearing post member having an axial length dimension at least ten (10) times greater than said effective radial gap dimension.

5. The pivot fastener of claim 3, wherein said means for resisting normal rotation further comprises:
   said bearing surface of said bearing post member having said axial length dimension no larger than four (4) times greater than said effective radius dimension.

6. The pivot fastener of claim 1 wherein said first and second bushing members each additionally include one or more tool slots in their mating faces for permitting driving of said members into prepared bores in their respective first and second parts.

7. The pivot fastener of claim 1, wherein the bearing surface on the bearing post member is generally cylindrically shaped in axial cross section and having a substantially constant radius throughout its length.

8. The pivot fastener of claim 7 wherein the first retaining flange is positioned near the base of the post member and the self engaging reduced diameter portion of the opening is positioned correspondingly therein.

9. The pivot fastener of claim 1 wherein said bearing post member additionally includes a second circumferential retaining flange and said opening in said second bushing member includes a second reduced diameter portion for engaging the same to further resist separation of said first and second bushing members once engaged while continuing to permit relative axial rotation therebetween.

10. The pivot fastener of claim 1 useful in coupling a first part with a first bore to a second part with a second bore additionally including inserts placed in each of the respective bores, said inserts having means by which said inserts are secured to the respective parts and means by which said bushing members are secured to said inserts.

11. The pivot fastener of claim 6 wherein said securing means for said first and second bushing members includes a portion of the outer surfaces thereof being threaded for cutting into and gripping the walls of prepared bores in their respective first and second parts thereby fixing said members therein.

12. The pivot fastener of claim 6 wherein said securing means for said first and second bushing members includes a portion of the outer surfaces thereof being textured for being press fit into prepared holes in their respective first and second parts thereby fixing said members therein.

13. A pivot fastener useful in coupling a first part to a second part, comprising:
   a bearing post member, having an anchoring portion and a bearing portion, said bearing portion including a bearing surface and a first circumferential retaining flange;
   a first bushing member, having an outer surface with means for securing said first bushing member in fixed relationship to a first part, said first bushing member also having a mating face including a first axially-extending opening for receiving the anchor portion of said post member in a locking relationship preventing separation thereof or relative rotation therebetween;
   a second bushing member having an outer surface with means for securing said second bushing member in fixed relationship to a second part, said second bushing member also having a mating face including a second axially-extending opening, coextensive with said bearing post member, for receiving the bearing portion of said bearing post member therethrough, said second opening having a mating bearing surface with a reduced diameter portion for engaging said first retaining flange in a snap-fit relationship for preventing separation of said first and second bushing members when the bearing post member is received therein, while also permitting relative axial rotation therebetween; and
   means, including said bearing surface on said bearing portion coacting with said mating bearing surface on said second axially-extending opening in said second bushing member, for resisting normal rotation of said first bushing member relative to the second bushing member while also permitting relative axial rotation therebetween, wherein said normal rotation is about an axis perpendicular to the axis of said bearing post member.

14. The pivot fastener of claim 13, wherein said means for resisting normal rotation comprises:
   said bearing surface on said bearing portion having an axial length of fixed dimensional relationship with the effective radial gap between said bearing surface on the bearing post member and the mating bearing surface on said second axially-extending opening in said second bushing when the bearing post member is received therethrough.

15. The pivot fastener of claim 14, wherein said means for resisting normal rotation further comprises:
   said bearing surface on said bearing portion further having an axial length of fixed dimensional relationship with the effective radius of said bearing surface.

16. The pivot fastener of claim 14, wherein said means for resisting normal rotation further comprises:
   said bearing surface of said bearing portion having said axial length dimension at least ten (10) times greater than said effective radial gap dimension.

17. The pivot fastener of claim 16, wherein said means for resisting normal rotation further comprises:
   said bearing surface of said bearing portion having said axial length dimension no larger than four (4) times greater than said effective radius dimension.

18. The pivot fastener of claim 13 wherein said first bushing member and said second bushing member each additionally comprise one or more driving tool slots.

19. The pivot fastener of claim 13 wherein said bearing post member additionally comprises a second circumferential retaining flange and said second opening of said second bushing member engages said first and second retaining flanges preventing separation of said first bushing member from said second bushing member once said bearing post member is inserted therein while also permitting said first bushing member to rotate axially relative to said second bushing member.

20. The pivot fastener of claim 13 wherein said outer surfaces of said first and second bushing members have texture means for press fit securing of said first bushing member in fixed relationship to said first part and said second bushing member in fixed relationship to said second part.

21. A pivot fastener useful in coupling a first part with a first bore to a second part with a second bore, comprising;

a first bushing member, said first bushing member having a first mating face portion and a first lead end portion, said first lead end portion having an expanded state and an unexpanded state, said first lead end portion sized for insertion into said first bore and having an axially extending first aperture with a knurled surface, said first mating face portion including a central bearing post section and a first circumferential ring section, said bearing post section including an axially extending bearing post member having a bearing end with a first circumferential retaining flange and an adjacent base portion with a knurled outer surface, said first mating face portion having a first sleeve detachably connecting said bearing post section to said first ring section, said first sleeve detaching permitting said bearing post section to advance through said first aperture and expanding said first lead end portion securing said first bushing member in fixed relationship in said first bore, the surface of said first aperture engaging with said base portion preventing separation of said bearing post section from said first ring section; and, a second bushing member, said second bushing member having a second mating face portion and a second lead end portion, said second lead end portion having an expanded state and an unexpanded state, said second lead end portion sized for insertion into said second bore and having an axially extending second aperture with a knurled surface, said second mating face portion including a central bearing post receiving section and a second circumferential ring section, said bearing post receiving section having a knurled outer surface, said bearing post receiving section having an axially-extending opening for receiving said bearing end of said bearing post member, said opening engaging said first retaining flange preventing separation of said first bushing member from said second bushing member once said bearing post member is inserted therein while also permitting said first bushing member to rotate axially relative to said second bushing member, said second mating face portion having a second sleeve detachably connecting said bearing post receiving section to said second ring section, said second sleeve detaching permitting said bearing post receiving section to advance through said second aperture expanding said second lead end portion and securing said second bushing member in said second bore, said second aperture engaging said bearing post receiving section preventing separation of said bearing post receiving section and said second ring section; and means, including said bearing end on said bearing post member coacting with said axially-extending opening in said second bushing member, for resisting normal rotation of said first bushing member relative to the second bushing member while also permitting relative axial rotation therebetween, wherein said normal rotation is about an axis perpendicular to the axis of said bearing post member.

22. The pivot fastener of claim 21, wherein said means for resisting normal rotation comprises:
said bearing end having an axial length of fixed dimensional relationship with the effective radial gap between said bearing end on said bearing post member and said axially-extending opening in said second bushing when the bearing post member is inserted therein.

23. The pivot fastener of claim 22, wherein said means for resisting normal rotation further comprises:
said bearing end further having an axial length of fixed dimensional relationship with the effective radius of said bearing end.

24. The pivot fastener of claim 22, wherein said means for resisting normal rotation further comprises:
said bearing end of said bearing post member having said axial length dimension at least ten (10) times greater than said effective radial gap dimension.

25. The pivot fastener of claim 23, wherein said means for resisting normal rotation further comprises:
said bearing end of said bearing post member having said axial length dimension no larger than four (4) times greater than said effective radius dimension.

26. The pivot fastener of claim 21, wherein the bearing end on the bearing post member is generally cylindrically shaped in axial cross section and having a substantially constant radius throughout its length.

27. The pivot fastener of claim 26 wherein the first retaining flange is positioned near the base of the post member and the self engaging reduced diameter portion of the opening is positioned correspondingly therein.

28. The pivot fastener of claim 21 wherein said bearing post member additionally includes a second circumferential retaining flange and said opening in said second bushing member includes a second reduced diameter portion for engaging the same to further resist separation of said first and second bushing members once engaged while continuing to permit relative axial rotation therebetween.

29. A pivot fastener useful in coupling a first part to a second part, comprising:

a first bushing member having an outer surface with means for securing said first bushing member in fixed relationship to a first part, said first bushing member also having a first mating face including an axially-extending first bearing post member with a bearing end;

a second bushing member having a second mating face, an outer end surface and an outer circumferential surface with means for securing said second bushing member in fixed relationship to a second part, said second bushing member also having a first bore axially extending between said second mating face and said outer end surface, for receiving the bearing end of the first bearing post member therethrough, said first bore having a mating bearing surface permitting relative axial rotation therebetween; and means, including said first bearing post member coacting with said outer end surface of said second bushing member, for resisting separation of said first bushing member relative to the second bushing member while also permitting relative axial rotation therebetween, and wherein said means for resisting separation comprises:

an axially-extending second bore in said bearing end of said bearing member;

said outer end surface having a countersunk portion with a first bearing surface and a centrally-located opening axially aligned and contiguous with said first bore in the second bushing member; and a retaining pin having a head portion with a second bearing surface and a second post member with a knurled outer surface, said second post member projecting perpendicularly from said second bearing surface of said head portion, said second bearing surface being in bearing contact with said first bearing surface within said countersunck portion permitting axial rotation therebetween, said second post member extending axially through said opening and said first bore, the knurled outer surface of the post member being in press-fit engagement with said second bore in said first bearing post member.

30. The pivot fastener of claim 29, wherein:

said countersunk portion further includes a circumferential locating surface perpendicular to said second bearing surface, said locating surface having an inwardly projecting lip generally opposing the second bearing surface; and said lip of the locating surface is so designed to trap and retain the head portion of said retaining pin between the lip and the second bearing surface in the countersunk portion once the retaining pin has been pressed into the countersunk portion, while permitting relative axial rotation of the head portion therebetween.

31. The pivot fastener of claim 30, wherein:

said first mating face has a circumferential locking sleeve; and said second mating face has a circumferential locking collar sized to fit and engage within the locking sleeve to further resist normal relative rotation between said first bushing member and said second bushing member while permitting relative axial rotation therebetween, wherein said normal rotation is about an axis perpendicular to the axis of said bearing post member.

32. The pivot fastener of claim 31, wherein:

said first mating face further has a circumferential shoulder at the base of said first bearing post member; and said second mating face further has a circumferential depression located and sized to fit and receive said circumferential shoulder to further resist normal relative rotation between said first and second bushing members while permitting relative axial rotation therebetween.

33. The pivot fastener of claim 30 useful in coupling a first part with a first bore to a second part with a second bore, additionally including inserts placed in each of the respective bores, said inserts having means by which said inserts are secured to the respective parts and means by which said bushing members are secured to said inserts.

34. The pivot fastener of claim 33, wherein:

said first mating face has a circumferential shoulder at the base of said first bearing post member; and said second mating face has a circumferential depression located and sized to fit and receive said circumferential shoulder to further resist normal relative rotation between said first and second bushing members while permitting relative axial rotation therebetween, wherein said normal rotation is about an axis perpendicular to the axis of said bearing post member.

35. The pivot fastener of claim 1, wherein:

said reduced diameter portion is distal said mating face and includes snap-fit means for resiliently expanding said reduced diameter portion when said bearing post member is inserted therethrough.

36. The pivot fastener of claim 1, wherein:

said reduced diameter portion is generally coextensive with said mating bearing surface; and said bearing post member includes snap-fit means, at said first circumferential retaining flange, for resiliently compressing said bearing post member when said post member is inserted through said reduced diameter portion of said second bushing member.

37. The pivot fastener of claim 13, wherein:

said reduced diameter portion is distal said mating face and includes snap-fit means for resiliently expanding said reduced diameter portion when said bearing post member is inserted therethrough.

38. The pivot fastener of claim 13, wherein:

said reduced diameter portion is generally coextensive with said mating bearing surface; and said bearing post member includes snap-fit means, at said first circumferential retaining flange, for resiliently compressing said bearing post member when said post member is inserted through said reduced diameter portion of said second bushing member.

* * * * *